US011738734B2

United States Patent
Haubenhofer et al.

(10) Patent No.: US 11,738,734 B2
(45) Date of Patent: Aug. 29, 2023

(54) EMERGENCY BRAKE DEVICE FOR A RAIL VEHICLE

(71) Applicant: Siemens Mobility Austria GmbH, Vienna (AT)

(72) Inventors: Martin Haubenhofer, Graz (AT); Mehrdad Madjdi, Vienna (AT); Rudolf Schmidt, Vienna (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 13 days.

(21) Appl. No.: 17/627,293

(22) PCT Filed: Jul. 9, 2020

(86) PCT No.: PCT/EP2020/069367
§ 371 (c)(1),
(2) Date: Jan. 14, 2022

(87) PCT Pub. No.: WO2021/008990
PCT Pub. Date: Jan. 21, 2021

(65) Prior Publication Data
US 2022/0274579 A1 Sep. 1, 2022

(30) Foreign Application Priority Data
Jul. 18, 2019 (AT) .............. A 50648/2019

(51) Int. Cl.
*B60T 17/20* (2006.01)
*B60T 15/02* (2006.01)
*B60T 13/68* (2006.01)
*B60T 13/38* (2006.01)

(52) U.S. Cl.
CPC ............ *B60T 17/20* (2013.01); *B60T 13/385* (2013.01); *B60T 13/683* (2013.01); *B60T 15/027* (2013.01)

(58) Field of Classification Search
CPC ........ B60T 13/26; B60T 13/266; B60T 13/38; B60T 13/385; B60T 13/683; B60T 15/027; B60T 17/20
USPC ........ 303/13, 14, 15, 16, 17, 20, 25, 26, 27, 303/81, 86
See application file for complete search history.

(56) References Cited

U.S. PATENT DOCUMENTS

2005/0029859 A1 2/2005 Bensch et al.
2022/0274579 A1* 9/2022 Haubenhofer ........ B60T 13/683

FOREIGN PATENT DOCUMENTS

| CH | 593162 | 11/1977 |
|---|---|---|
| CN | 201183482 Y | 1/2009 |
| CN | 102596670 | 7/2012 |
| CN | 203005413 U | 6/2013 |
| CN | 108791259 | 11/2018 |
| CN | 109131286 | 1/2019 |
| DE | 102006042418 A1 | 2/2008 |

(Continued)

OTHER PUBLICATIONS

PCT International Search Report dated Dec. 3, 2020 based on PCT/EP2020/069367 filed Jul. 9, 2020.

*Primary Examiner* — Thomas J Williams
(74) *Attorney, Agent, or Firm* — Cozen O'Connor

(57) ABSTRACT

An emergency brake device for a rail vehicle includes a compressed-air-brake system, wherein a braking process can be initiated by lowering the air pressure in a main air conduit and which includes an exclusively electric connection to a passenger emergency brake.

4 Claims, 1 Drawing Sheet

(56) References Cited

FOREIGN PATENT DOCUMENTS

| DE | 102017214553 | | 2/2019 | |
|----|--------------|---|--------|---|
| EP | 1743821 | | 1/2007 | |
| EP | 1783019 | | 5/2007 | |
| EP | 1932739 A1 | * | 6/2008 | ............. B60T 17/20 |
| EP | 2055541 A1 | * | 5/2009 | ............ B60T 13/385 |
| EP | 3300976 | | 4/2018 | |
| JP | 2018-047756 | | 3/2018 | |
| WO | 2008012112 | | 1/2008 | |
| WO | WO-2008092683 A1 | * | 8/2008 | ............. B60T 13/04 |

* cited by examiner

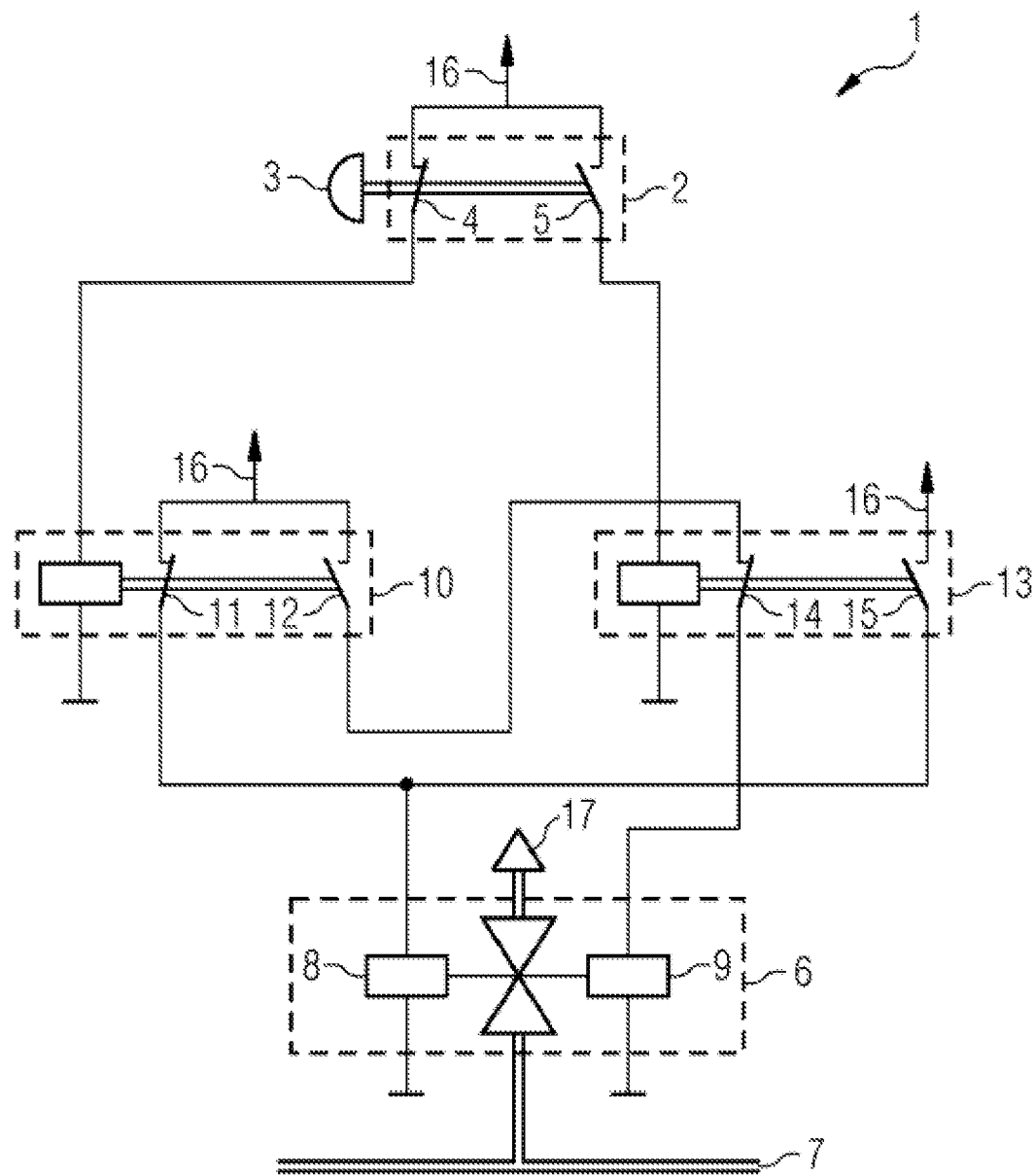

EMERGENCY BRAKE DEVICE FOR A RAIL VEHICLE

CROSS-REFERENCE TO RELATED APPLICATIONS

This is a U.S. national stage of application No. PCT/EP2020/069367 filed 9 Jul. 2020. Priority is claimed on Austrian Application No. A50648/2019 filed 18 Jul. 2019, the content of which is incorporated herein by reference in its entirety.

BACKGROUND OF THE INVENTION

1. Field of the Invention

The invention relates to an emergency brake device for a rail vehicle equipped with a compressed air brake facility.

2. Description of the Related Art

According to relevant approval regulations, passenger rail vehicles are to be equipped with emergency brakes that can be operated by passengers. The functionality thereof is based on the pressure in a compressed air line, known as the main air line or brake pipe, being reduced by manual actuation of a handle, which causes the brake pads to be applied to the brake disks or wheel rims. Additionally, emergency brake devices are equipped with further functions, for example, an emergency brake override for preventing the vehicle from coming to a standstill on an unsuitable track section, such as in a tunnel or on a bridge. The function of an emergency brake makes it necessary to guide the main air line, or a tubular section toward the main air line that is connected thereto, to each passenger emergency brake. Passenger rail vehicles are usually equipped with a plurality of passenger emergency brakes (even with one for each compartment in sleeper cars). As a result, a plurality of compressed air lines are to be guided toward the main air line and to be connected thereto. This necessitates a large outlay for pipework and increases the probability of fault, because each leak on the compressed air lines would lead to false triggering of the emergency brake. The exclusively electrical connection of the passenger emergency brakes may represent a significant simplification, but is only common in multiple-unit trains. In conventional UIC/RIC passenger cars, the safety requirements currently cannot be implemented without directly connecting the passenger emergency brakes to the compressed air system. In this context, the requirements to be met are for safety in relation to the failure of on-board voltage (such a failure is not permitted to lead to an unrequested triggering of an emergency brake) and for the safety of trigger recognition (an individual fault is not permitted to lead to a triggering of an emergency brake not being displayed in a driver's cab).

SUMMARY OF THE INVENTION

In view of the foregoing, it is therefore an object of the invention to provide an emergency brake device for a rail vehicle, which can be used in UIC/RIC passenger cars, and which exclusively requires electrical connections to the passenger emergency brakes.

This and other objects and advantages are achieved in accordance with the invention by an emergency brake device for a rail vehicle with a compressed air facility, in which braking can be caused by lowering the air pressure in a main air line, where at least one passenger emergency brake is provided, which comprises a manually actuatable passenger emergency brake handle, which acts on an electrical opening contact and a closing contact in each case, and where a bistable, electromagnetically actuatable compressed air valve is provided, which is configured for venting a main air line into the open air and which comprises an opening magnetic drive and a closing magnetic drive in each case, and where an opening relay is provided, which comprises an electrical opening contact and a closing contact in each case, and where a closing relay is provided, which comprises an electrical opening contact and a closing contact in each case, where the inputs of the electrical opening contact and the closing contact of the passenger emergency brake are connected to a supply voltage and the output of the opening contact of the passenger emergency brake is guided to the electrical drive of the opening relay and the output of the closing contact of the passenger emergency brake is guided to the electrical drive of the closing relay, where the inputs of the opening contact and the closing contact of the opening relay are connected to a supply voltage, where the output of the closing contact of the opening relay is guided to the input of the opening contact of the closing relay, where the input of the closing contact of the closing relay is connected to a supply voltage, where the output of the opening contact of the closing relay is guided to the closing magnetic drive of the compressed air valve, and where both the output of the opening contact of the opening relay and the output of the closing contact of the closing relay are guided to the opening magnetic drive of the compressed air valve.

This makes it possible to achieve the advantage of being able to dispense with the compressed air lines to the passenger emergency brakes provided in prior art solutions, and provides an exclusively electrical transfer of the emergency brake triggering to a compressed air valve.

In this context, significant requirements for an emergency brake device are met, which could not yet be implemented in conventional (UIC/RIC) passenger cars, because these provide the direct connection of the passenger emergency brakes to the compressed air system on a mandatory basis.

In particular, it is an advantage that a failure of the operating voltage cannot lead to an undesired triggering of an emergency brake.

In accordance with the invention, a bistable compressed air valve is provided, which is connected to a compressed air line, the pressure of which controls the brake activation, where braking is triggered in the event pressure in the compressed airline becomes lowered. This compressed air valve vents the compressed air line into the open air, or blocks this venting, as a function of its actuation. In this context, the compressed air valve has two electromagnetic drives, via which the compressed air valve can be switched between an open and a closed position. Without electrical actuation, the compressed air valve remains in its last position.

Through the use of two contacts (one opening and one closing contact) in the passenger emergency brake, which each emit a signal that is inverted in relation to one another, it is possible for single faults to have no effect. In particular, in the circuit in accordance with the invention, one of the two contacts in the passenger emergency brake may be defective, without limiting the function of the emergency brake.

In a further embodiment of the invention, it is advantageous to equip the emergency brake device with signal transfer to a vehicle controller. Here, the signal actuating the opening magnetic drive, i.e., the output of the opening contact of the opening relay as well as the output of the closing contact of the closing relay, is to be guided to a car controller. In such a manner, it is possible for further functions, in particular an item of information regarding a triggered emergency brake, to be transmitted to the vehicle driver.

In a preferred embodiment of the invention, an electromagnetically actuatable emergency brake override valve is arranged between the main air line and the bistable, electromagnetic compressed air valve. In such a manner, it is possible for a triggered emergency braking to be overridden by a vehicle driver, i.e., it is possible to prevent stopping at an unsuitable location.

In this context, the supply voltage is to be taken from a secured source, which preferably is configured with redundancy. This is particularly significant, because single faults, e.g., the failure of the supply voltage of the emergency brake device, are not permitted to lead to triggering of the emergency brake, but triggering is also no longer possible in the event of failure. For this reason, the supply voltage is to be taken from a battery-buffered electrical circuit that is only provided for the emergency brake device and is supplied from a current converter via a diode bridge during operation. In the event of a failure of the current supply of a car, it is possible for the supply voltage for the emergency brake device to be taken from the rest of the train, i.e., the adjacent cars.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail in the following text on the basis of exemplary embodiments, in which:

The FIGURE shows an emergency brake device in accordance with the invention.

DETAILED DESCRIPTION OF THE EXEMPLARY EMBODIMENTS

The FIGURE shows, by way of example and schematically, an emergency brake device. The electrical and pneumatic circuit diagram of an emergency brake device 1 is shown. The illustrated emergency brake device 1 comprises a passenger emergency brake 2, a bistable, electromagnetic compressed air valve 6, an opening relay 10 and a closing relay 13. The passenger emergency brake 2 is equipped with a manually operable passenger emergency brake handle 3, which is mechanically coupled to an opening contact 4 and a closing contact 5 and can move the contacts 4, 5 between a rest position, as shown in FIG. 1, and an emergency brake position. Compressed air valve 6 is pneumatically connected to a main air line 7 and has a vent 17, via which the compressed air guided in the main air line 7 can escape into the open air. In this context, the compressed air valve 6 can be switched between a closed and an open position, for which purpose two drives 8, 9 are provided. Here, an opening magnetic drive 8 is provided for opening the compressed air valve 6 and consequently venting the main air line 7, and a closing magnetic drive 9 is provided for closing the compressed air valve 6.

If neither of the drives is energized, then the compressed air valve 6 remains in its last position. An opening relay 10 with electromagnetic drive is equipped with an opening contact 11 and a closing contact 12 in each case, which can be actuated simultaneously by the electromagnetic drive. A closing relay 13 has the same construction as the opening relay 10 and therefore also comprises an electromagnetic drive, an opening contact 14 and a closing contact 14.

A supply voltage 16 is applied to each of the inputs of the two contacts 4, 5 of the passenger emergency brake 2, as well as the inputs of the contacts 11 and 12 of the opening relay 10. The supply voltage 16 is likewise applied to the input of the closing contact 15 of the closing relay 13. The output of the closing contact 12 of the opening relay 10 is guided to the input of the opening contact 14 of the closing relay 15. The outputs of the opening contact 11 of the opening relay 10 and the output of the closing contact 15 of the closing relay 13 are each guided to the input of the opening magnetic drive 8 of the compressed air valve 6. The output of the opening contact 14 of the closing relay 13 is guided to the input of the closing magnetic drive 9 of the compressed air valve 6.

The FIGURE shows the emergency brake device 1 in accordance with the invention in a zero-voltage state, in which none of the relays 10, 13 are energized and the compressed air valve 6 maintains its last position.

The following describes the function of the emergency brake device 1 when the supply voltage 16 is available and when an emergency braking is triggered.

Emergency brake device 1 when supply voltage 16 is available:

If a supply voltage 16 is applied then, if the emergency brake handle 2 is not actuated, the supply voltage is conducted via the closed opening contact 4 of the passenger emergency brake 2 to the drive of the opening relay 10, thus energizing it and the opening relay 10 opens its opening contact 12 and closes its closing contact 11. In this context, the closing relay 13 is not energized, because the closing contact 5 of the passenger emergency brake 2 is open. The supply voltage 16 is therefore conducted via the closed closing contact 12 and via the closed opening contact 14 to the closing drive 9 of the compressed air valve 6, with the result that the compressed air valve 6 is moved into its closed position or held in said position and there is no escaping of compressed air via the vent 17.

If there is a failure of the supply voltage 16 in this state of the emergency brake device 1, then the opening relay 10 is deenergized, but the compressed air valve 6 remains in the closed position and there is no venting of the main air line 7.

Emergency brake device 1 when supply voltage 16 is present and emergency brake is triggered:

If the emergency brake is triggered, i.e., the passenger emergency brake handle 3 is actuated, then the opening contact 4 of the passenger emergency brake 2 is opened and the closing contact 5 of the passenger emergency brake 2 is closed. Thus, the supply voltage 16 is not conducted to the drive of the opening relay 10, which means that it is no longer energized and becomes deenergized. As a result, the opening contact 11 of the opening relay 10 is closed and the closing contact 12 of the opening relay 10 is opened. Due to the closed closing contact 5 of the passenger emergency brake 2, the supply voltage 16 is guided to the drive of the closing relay 13, which means that the opening contact 14 of the closing relay 13 is opened and the closing contact 15 of the closing relay 13 is closed. By opening the opening contact 14 of the closing relay 13, the closing magnetic drive 9 of the compressed air relay 6 is no longer energized. The supply voltage 16 is applied to the opening drive 8 of the compressed air relay 6 both via the closed opening contact 11 of the opening relay 10 and via the closed closing contact 15 of the closing relay 13. As a result, the compressed air valve 6 is moved into its open position or held in said position, and there is an escape of compressed air via the vent 17.

In vehicles with a plurality of passenger emergency brakes 2, the outputs of their closing contacts 5 are to be connected in parallel and guided to the drive of a closing relay 13, and the opening contacts 4 are to be connected in series, meaning that the supply voltage 16 is to be applied to only one input of an opening contact. As a result, the function in accordance with the invention can also be obtained with a plurality of passenger emergency brakes 2.

Thus, while there have been shown, described and pointed out fundamental novel features of the invention as applied to a preferred embodiment thereof, it will be understood that various omissions and substitutions and changes in the form and details of the the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An emergency brake device for a rail vehicle with a compressed air brake facility, in which braking is causable by lowering air pressure in a main air line, the emergency brake device comprising:
   at least one passenger emergency brake comprising a manually actuatable passenger emergency brake handle, which acts on a first electrical opening contact and a first closing contact;
   a bistable, electromagnetically actuatable compressed air valve which is configured to vent the main air line into open air and which comprises an opening magnetic drive and a closing magnetic drive;
   an opening relay comprising a second electrical opening contact and a second closing contact;
   a closing relay comprising a third electrical opening contact and a third closing contact, inputs of the first electrical opening contact and the first closing contact being connected to a supply voltage, an output of the first electrical opening contact being guided to a first electrical drive of the opening relay and an output of the first closing contact being guided to a second electrical drive of the closing relay;
   wherein inputs of the second electrical opening contact and the second closing contact of the opening relay are connected to the supply voltage;
   wherein an output of the second electrical closing contact of the opening relay is guided to an input of the third electrical opening contact of the closing relay;
   wherein an input of the third closing contact of the closing relay is connected to the supply voltage;
   wherein an output of the third electrical opening contact of the closing relay is guided to the closing magnetic drive of the bistable, electromagnetically actuatable compressed air valve; and
   wherein both the output of the second electrical opening contact and the output of the third closing contact are guided to the opening magnetic drive of the compressed air valve.

2. The emergency brake device for a rail vehicle as claimed in claim 1, wherein both the output of the opening contact and the output of the closing contact are guided to a car controller.

3. The emergency brake device for a rail vehicle as claimed in claim 2, further comprising:
   an electromagnetically actuatable emergency brake override valve arranged between the main air line and the bistable, electromagnetic compressed air valve.

4. The emergency brake device for a rail vehicle as claimed in claim 1, further comprising:
   an electromagnetically actuatable emergency brake override valve arranged between the main air line and the bistable, electromagnetic compressed air valve.

* * * * *